UNITED STATES PATENT OFFICE.

JOSEPH H. CAMPBELL, OF NEW YORK, N. Y.

PROCESS OF MAKING DESICCATED MILK.

SPECIFICATION forming part of Letters Patent No. 718,191, dated January 13, 1903.

Application filed July 18, 1900. Serial No. 24,037. (No specimens.)

*To all whom it may concern:*

Be it known that I, JOSEPH H. CAMPBELL, a citizen of the United States, residing in the city, county, and State of New York, have invented a certain new and useful Improved Process of Making Desiccated Milk, of which the following is a specification.

This invention relates to the treatment of milk, such as ordinary cows' milk, for the production of a desiccated-milk product.

The process of the invention is also applicable to the desiccation of substances having similar properties to milk, such as mixtures of milk and other substances.

In its preferred form my invention aims to produce such a product in which not only are all the non-fatty solids of the milk retained, but also the casein and other proteids preserve all their original peptogenic properties and are readily soluble in water.

My invention also aims to produce a product from which the moisture is so completely removed that the milk is reduced to the form of dry cakes or a dry powder, which can be kept indefinitely and shipped even to tropical climates as safely as flour.

Various attempts have been made for many years past to desiccate milk or reduce it to the condition of a dry powder or cake; but prior to my successful accomplishment of this result all such efforts, so far as I am aware, have been failures. The products of such attempts have been pasty by reason of the retention of the milk-fats, non-peptogenic and comparatively insoluble by reason of the high temperature necessary in carrying out the proposed processes, sour by reason of the slowness of the process, or lacking in some of the valuable solids of the milk. According to my improved process the desiccation is carried out so rapidly as to prevent souring and at a temperature below the coagulating-point of albumen, so as to preserve the solubility and peptogenic qualities of the proteids.

The desiccated milk which is contained in the product of my process and which may compose the entire product consists almost solely of non-fatty milk solids, there being no added sugar and the proportion of free water being reduced to about eight per cent. This desiccated milk when made according to the preferred process is readily soluble, is easily assimilated, and constitutes a food product of great value, since it contains all the proteids or nitrogenous substances of the milk in their original soluble condition.

Prior to my invention no one, as far as I am aware, has succeeded in producing a desiccated milk wherein are combined the non-fatty solids of milk unchanged in proportion or character and wherein the proteids are retained of undiminished solubility and susceptibility to peptic action, or, in other words, a dried milk which is readily soluble in water and as digestible as fresh milk.

The process of complete reduction to desiccated milk or to a desiccated-milk product naturally divides itself into two stages, the first that in which the milk is treated as a liquid and the second that in which it is reduced to a solid. The first stage involves the partial concentration of the milk from its original liquid form down to approximately one-fourth its original weight or until it reaches the consistency of a paste or very thick cream or batter. The second stage is that in which it is reduced from the consistency of paste or batter to that of a dry solid substance.

For the production of a product of good color and taste free from burned particles and containing all the original solids of the milk it is advisable during the first stage of the reduction to employ the process of air-injection set forth in my application for patent for a process for the treatment of milk and product thereof, Serial No. 22,105, filed June 30, 1900, Patent No. 668,151, dated February 19, 1901. For the production of a product in which the proteids of the milk retain their original solubility and peptogenic qualities it is essential that such process be carried out at a temperature below the coagulating-point of albumen, as indicated in said application. Said application discloses fully the process of reducing the milk from its original fluid state to about the consistency of ordinary condensed milk.

My present invention relates to a process in which any process (but preferably that stated) may be employed during the first stage and in which certain improvements are provided pertaining specifically to the second stage, the reduction from a pasty consistency to that of a dry solid substance.

To enable others to practice my invention, I will describe the entire process, including the first stage as covered by the above-mentioned application, and then the second stage.

First stage: Fresh skimmed milk is heated by external means and is maintained at a desired temperature during the concentrating process. In order to effect the concentration, I blow air into the milk in volume depending on the temperature applied and on the desired temperature in the milk, as hereinafter explained. The air circulates through the liquid and takes up moisture therefrom, at the same time agitating the milk. By this means I am able to effect a rapid evaporation at a low temperature. For the purpose of producing a condensed milk whose proteids are uninjured whatever process is used the milk should not be subjected to a temperature higher than the coagulating-point of albumen, 162° Fahrenheit. For absolute perfection in this respect the temperature should be maintained below even the temperature at which coagulation commences or at which a solution of albumen becomes cloudy. The improved air-injection process above described is especially adapted to such a purpose, since it makes it possible to effect concentration at a low temperature, since it can nevertheless be operated with sufficient rapidity and since it does not introduce further complications, such as caking or burning of a part of the product. In applying this process to the concentration of milk at such a temperature as to avoid injury to the proteids the milk is heated by external means, as above stated, and is maintained at a desired temperature below the coagulating-point of albumen by injecting a blast of air, according to the process outlined above, though the details may be varied somewhat. The evaporation by air injection is continued until the milk is of the consistency of ordinary condensed milk and preferably is further continued until the milk becomes a stiff paste or batter and fails to close together after the escape of the air-bubbles, but instead forms holes or fissures through which the air freely escapes, so that the agitation of the mass by reason of the air-blast so nearly ceases as to become ineffective, or the consistency of the milk may be altered from that of condensed milk to that of a stiff paste or batter in any other suitable way—such, for example, as that disclosed in application for patent Serial No. 11,420, filed April 4, 1900, for process for desiccating milk, Patent No. 668,162, dated February 19, 1901, to myself and Charles H. Campbell.

Second stage: In all prior attempts to desiccate milk great difficulty has been experienced in carrying the product from the condition of a stiff paste to which it is reduced by the processes outlined above to a condition of such solidity as to permit its ready desiccation by means of ordinary driers. The material is extremely liable to fermentation during this intermediate stage, and it has been found necessary to accelerate the drying by using such a high temperature as would discolor the product and render its casein insoluble, since to retard the rate of drying would cause the milk to become sour. My present invention successfully overcomes these difficulties.

My improved treatment involves the mixture with such paste or batter of a sufficient proportion of a solid absorbent alimentary material (preferably desiccated-milk powder) to reduce the mass to a nearly solid or putty-like condition and so dry as to be easily broken into lumps or subdivided, whereupon it is completely desiccated in an ordinary drier.

If a pure milk product is desired the paste or batter is mixed with a portion of previously desiccated and powdered milk in a proportion which will vary somewhat, according to the density of the batter, but with a batter of considerable density will ordinarily be in the neighborhood of one pound of the dry powder to about four pounds of the batter. The more water remaining in the product of the first stage the more absorbent powder is required to be added in the second stage. For that reason it is economical to carry the milk in the first stage beyond the consistency of condensed milk, as described, to that of as thick a batter as will thoroughly and easily mix with the absorbent powder. The two are thoroughly commingled in any suitable way, as by mechanical stirring. Preferably where the first-mentioned process of bringing it to a stiff paste is employed the powder is put into the vat, where it is stirred into the batter. After this treatment the material is found to be sufficiently dry so as to be easily broken up, whereupon the mixing is discontinued. It is then broken into small pieces and dried by any suitable means at a temperature preferably approximating 120° Fahrenheit, but possibly higher, as in the first stage. For example, it may be placed in a drier, where it is subjected to the desired temperature, while air heated to approximately the same temperature is circulated over the material, this drying operation being continued until the material becomes hard and free from all pasty or doughy quality. The material is then preferably ground to a powder in any suitable mill. The powder thus formed is so nearly anhydrous as to present every appearance of being perfectly dry. It resembles white-wheat flour in consistency and may be handled, packed, transported, and kept in the same manner and without necessity for other precautions than those necessary with such flour.

If a desiccated mixture of milk solids with other substances be desired, the milk paste or batter is mixed with a portion of such substance or substances, the latter being in a desiccated and powdered condition. The total proportion of such desiccated foreign ingredient added should be about as indicated above for a pure milk product, though a greater proportion may be used, according to the final product desired. If a smaller proportion of the foreign ingredient be desired, the desiccated material added to the milk paste may be composed partly of the foreign ingredient and partly of desiccated milk. The drying and grinding are then continued until a desiccated product is obtained in which the milk solids and the foreign ingredient or ingredients are intimately incorporated.

The foreign ingredient which I design to use may be any aliment obtainable in a desiccated powdered condition and which will not be injurious to the milk. I may mention as specific examples powdered cereals and ground cocoa or coffee, though my invention is independent of the specific powder used.

Instead of forming a desiccated powder the milk product may be formed into cakes. For this purpose the powder may be prepared as already described and then pressed in molds, or the stiff paste may be rolled into sheets or pressed into cakes, and the sheets or cakes thus formed may then be slowly dried until the material becomes quite hard. In any event the heat used in drying should not exceed the coagulating-point of albumen and for the best results should not be above 120° Fahrenheit.

For a desiccated product containing a substantial percentage of milk solids, a minute proportion of fatty material is admissible, although undesirable, and a normal proportion thereof would prevent the desiccation of the milk—that is to say, the product instead of being a dry cake or powder would be of a consistency resembling butter or cheese and very liable to fermentation.

Though I have described with great particularity of detail a process embodying my invention, yet I am not to be understood as limiting myself to the specific details disclosed. It will be obvious that many modifications thereof are possible to those skilled in this art without departing from the spirit of the invention.

I claim as my invention the following-defined novel features, substantially as hereinbefore specified, namely:

1. The process of treating milk which consists in evaporating it by blowing air into it until it is concentrated to the consistency of a batter, then mixing a desiccated powder with such batter to dry the mass to a putty-like consistency, and then drying this material by gentle heat and circulation of air over it until a desiccated product results, the entire process being carried out so rapidly as to prevent souring, and at a temperature maintained below the coagulating-point of albumen so as to preserve the solubility and peptogenic qualities of the proteids.

2. In the production of a desiccated-milk product, the process of reducing the milk from the consistency of a batter to that of putty, which consists in mixing therewith while of the consistency of a batter a desiccated powder.

3. The process of treating milk which consists in evaporating it to the consistency of a batter, then mixing a desiccated powder with such batter to bring the mass to a putty-like consistency, and then drying this material to desiccation.

4. The process of treating milk which consists in evaporating it to the consistency of a batter, then mixing with it a sufficient proportion of a solid absorbent alimentary material to bring it to a putty-like consistency, and finally drying it.

5. The process of producing desiccated milk which consists in evaporating milk to the consistency of a batter, then mixing with it a sufficient proportion of milk previously desiccated to solidity to bring the whole to a putty-like consistency, and finally drying it.

6. The process of treating milk which consists in removing cream therefrom and evaporating the remainder to the consistency of a batter, then mixing with it a sufficient proportion of a solid absorbent alimentary material to bring it to a putty-like consistency, and finally drying it.

In witness whereof I have hereunto signed my name in the presence of two subscribing witnesses.

JOSEPH H. CAMPBELL.

Witnesses:
D. A. USINA,
FRED WHITE.